3,384,587
**HYPERBASIC CALCIUM SULFONATE
LUBRICATING OIL COMPOSITION**
Edward H. Holst, Robert S. Edwards, and Claud E. Sibert,
Jr., Nederland, Tex., assignors to Texaco Inc., New
York, N.Y., a corporation of Delaware
No Drawing. Filed Feb. 4, 1966, Ser. No. 525,136
9 Claims. (Cl. 252—33.4)

ABSTRACT OF THE DISCLOSURE

A method of preparing hyperbasic calcium sulfonate lube oil concentrate useful as detergent dispersant additive in oils comprising forming a first reaction mixture of sulfonic acid or salt thereof, calcium hydroxide or calcium oxide and water, lower alkanol or lower alkoxy ethanol, and lubricating oil, sequentially injecting hydrogen sulfide and carbon dioxide under a hydrogen sulfide and carbon dioxide pressure of at least 10 p.s.i.g. and stripping off incidental water and oxygenated vehicle.

---

This invention relates to a process for preparing hyperbasic calcium sulfonate lubricating oil concentrates containing a high proportion of oil dispersible calcium.

Hyperbasic calcium sulfonate lube oil concentrates are useful as detergent-dispersant additives in lubricating oils, e.g., in amounts between about 1 and 10 wt. percent.

By the term "hyperbasic calcium sulfonate" we mean a product wherein the ratio of filterable oil dispersed and/or combined calcium equivalents to sulfonic acid equivalents in the sulfonate product is substantially above that present in a normal calcium sulfonate, that is, the equivalent ratio of calcium moiety to sulfonic acid moiety is substantially greater than 1:1. The formula for the normal calcium salt of monosulfonic acid can be written $(RSO_3)_2Ca$ where R stands for a hydrocarbyl radical. It is to be noted the number of hydrogen equivalents of calcium and of sulfonic acid filterably dispersed in said normal sulfonate are each two, and therefore, the calcium metal ratio is 1. In contradistinction, products from our process have substantially higher calcium metal ratios, e.g., of at least 2 and as high as 20 and higher filterably dispersed therein. By the term "metal ratio" we mean the ratio of equivalents of calcium to equivalents of sulfonic acid present in the particular mixture in filterable dispersion.

It is theorized that the hyperbasic calcium sulfonates contemplated herein are a complex mixture of normal calcium sulfonate and calcium carbonate in a physical and/or chemical relationship, with calcium carbonate supplying the excess, that is, the hyperbasing calcium.

In the past, much difficulty has been encountered in manufacturing hyperbasic calcium sulfonate lube oil concentrates in that often substantial portions of the calcium values therein would undesirably precipitate during storage and/or the concentrates were very turbid and required filtration to gain consumer acceptance. However, upon their filtration either an unacceptable amount of calcium values was lost and/or the particles of the normal calcium sulfonate-calcium carbonate complex were of sufficient size to fully or at least substantially block (blind) the filtering mechanism, thereby undesirably stopping the flow of material to be clarified or at least reducing the filtering rate to uneconomic proportions.

We have discovered and this constitutes our invention a method of producing hyperbasic calcium sulfonate lubricating oil concentrates having a calcium metal ratio of at least 2, preferably between about 10 and 18, a calcium content of at least 2 wt. percent, preferably between about 11 and 18 and a total base number (TBN), as defined in ASTM D#664, of at least about 20, preferably between about 280 and 450, in which the hyperbasic calcium sulfonate particles therein are of such a colloidal nature as to resist agglomeration and precipation and of such fineness as to permit the passage of the crude product through a standard clarifying means at an improved flow rate with a reduced loss of hyperbasic calcium sulfonate to produce a storage stable product of reduced turbidity and commercially acceptable clarity.

More particularly, we have discovered a particular combination of ingredients, reaction conditions and reaction steps which will produce a substantial amount of calcium sulfonate-calcium carbonate complex in lube oil in such a finely divided, colloidal, oil dispersible state as to permit its passage through standard filtering mechanisms with facility without substantial loss in calcium values to produce a product of improved clarity and further to produce a product which has a less than significant loss, if any, of the calcium values via precipitation upon standing or storage.

Specifically, our process comprises forming a first reaction mixture consisting of (1) a sulfo reactant selected from the group consisting of oil soluble sulfonic acid and alkali metal salts and calcium salts thereof, (2) a basic compound selected from the group consisting of calcium hydroxide, a combination of calcium oxide and water and mixtures thereof, (3) an oxygenated vehicle selected from the group consisting of lower alcohols and lower alkoxyethanols and (4) optionally a volatile liquid hydrocarbon diluent of a boiling point between about 170 and 300° F. The mole ratio of sulfo compound:basic compound:oxygenated compound in the first reaction mixture is advantageously between about 1:2:5 and 1:18:70.

Into said first reaction mixture, preferably in an agitated state, there is injected and dispersed throughout at a temperature between about 60 and 200° F. preferably between about 70 and 160° F., hydrogen sulfide under an average hydrogen sulfide pressure of at least about 10 p.s.i.g., preferably between about 40 and 60 p.s.i.g. in a mole ratio of hydrogen sulfide to basic calcium compound reactant of at least about 1:1, preferably between 2:1 and 5:1 and up to 40:1 and higher for a period of time, e.g., from 0.3 to 18 hours. Hydrogen sulfide pressures up to 1000 p.s.i.g. and higher are also contemplated, the higher pressures existing when hydrogen sulfide is introduced into the pressure reaction system as a liquid. At the end of the hydrogen sulfide treatment, carbon dioxide is subsequently injected into and dispersed throughout the hydrogen sulfide treated second reaction mixture at a temperature between about 60 and 200° F., preferably under agitation, under an average carbon dioxide pressure of at least about 10 p.s.i.g., preferably between about 40 and 60 p.s.i.g., in a mole ratio of carbon dioxide to basic calcium compound reactant of at least about 1:1, preferably between 2:1 and 5:1, and up to 40:1 and higher, for a period of time, e.g., from 1 to 18 hours. As in the hydrogen sulfide treatment, carbon dioxide pressures up to 1000 p.s.i.g. or higher are contemplated, particularly when carbon dioxide is introduced into the reaction mass in liquefied form. At the end of the carbon dioxide treatment, the oxygenated vehicle, hydrocarbon diluent (if any) and incidental water are stripped off, e.g., at a temperature between 140 and 350° F., preferably utilizing a stripping gas such as carbon dioxide or an inert gas, e.g., nitrogen, leaving crude hyperbasic calcium sulfonate-lube oil concentrate as residue.

Under advantageous circumstances, the crude concentrate product is filtered utilizing standard filtering procedures such as passing the crude product through filter or blotter paper precoated with a filter aid such as inert diatomaceous amorphous silica. The resultant filtrate is the clarified version of the hyperbasic calcium sulfonate lube oil concentrate of the invention.

In respect to the sulfo reactant, the sulfonic acid useful in our process or the sulfonic acid from which the useful neutral alkali metal or calcium sulfonate is derived includes oil soluble petroleum sulfonice acid such as mahogany sulfonic acid, alkylated aromatic sulfonic acid, petrolatum sulfonic acids, paraffin wax sulfonic acids, petroleum naphthene sulfonic acids, polyisobutylene sulfonic acids, mono- and poly-wax or other alkyl substituted benzene sulfonic acids, mono- and poly-wax or other alkyl substituted naphthalene sulfonic acids, mono- and poly-wax or other substituted cyclohexyl sulfonic acids, and mixtures of the foregoing. The preferred sulfonic acids in respect to forming a hyperbasic product concentrate of greatest clarity are the sulfonic acids derived from sulfonation of petroleum hydrocarbon fractions yielding a petroleum sulfonic acid having a molecular weight between about 350 and 1500, preferably between about 450 and 550, most preferably about 480.

Ordinarily, the sulfo reactant useful in our process is introduced into the reaction mixture in the diluted form, the diluent being an oily, water-immiscible, organic medium which for most cases will be petroleum or synthetic hydrocarbon fractions such as a lubricating oil fraction, a gas oil fraction or even a lighter cut such as benzene or light solvent naphtha. Alternatively, the oily diluent can be a synthetic lubricant such as polyoxyalkylene glycol of a molecular weight between about 200 and 4000, a polymerized olefin, trioctylphosphate, polymeric tetrahydrofuran and polyalkyl silicone polymer of a molecular weight range of 200 to 2000. The concentration of the sulfonic acid, alkali metal sulfonate or calcium sulfonate in the sulfo reactant when introduced into the reaction in diluted form is normally between about 10 and 100 wt. percent and mole generally between about 30 and 70 wt. percent. Hereinafter and hereinbefore we intend the term "sulfo reactant" to include the diluted as well as the undiluted form.

When alkali metal sulfonate is the sulfo compound, it is desirable to also include in the initial reaction mixture a calcium halide such as calcium chloride in order to facilitate the conversion of the alkali metal sulfonate via double decomposition into calcium sulfonate. The mole ratio of sulfo compound to halide employed is normally between about 2:1 and 2:1.1. It is to be noted when sulfonic acid is the sulfo reactant, the neutral calcium sulfonate is formed in situ by the reaction of a portion of the inorganic basic calcium reactant with the sulfonic acid.

In respect to the basic compound reactant, when the reactant is calcium oxide and water, sufficient water should be present to convert a substantial portion of the calcium oxide into the intermediate calcium hydroxide, otherwise the calcium carbonate will be directly formed from calcium oxide resulting in undesirably large final carbonate particles. Further, an excessive amount of water undesirably causes growth of the final calcium carbonate particles. The water content is advantageously between about 1:0.1 and 1:5, preferably 1:0.3 to 1:1.2 moles of calcium oxide to water. Further, if the basic calcium reactant is calcium hydroxide the water content of the reaction mixture desirably should not be above about 5 wt. percent based on the sulfo reactant for reasons of excessive carbonate particle growth. It is to be noted that the water may be supplied totally or in part from the water normally associated with the reactants, added water and/or reaction by-product water.

In regard to the oxygenated vehicle, this vehicle is preferably lower alkanol, that is, a $C_1$ to $C_3$ alkanol, most preferably methanol. It can also include lower alkoxyethanols such as 2-methoxyethanol, 2-ethoxyethanol, 2-propoxyethanol and 2-butoxyethanol.

Examples of the optional volatile hydrocarbon diluents are liquid aromatic and saturated aliphatic hydrocarbons, e.g., toluene, xylene and heptane generally having a boiling point between about 170 and 300° F. The volatile liquid insert medium facilitates the interaction or reactants as well as the filtration of the crude hyperbasic calcium sulfonate-lube oil concentrate. It is normally present in an amount of between about 15 and 40 wt. percent based on the initial reaction mixture.

The lubricating oil ingredient employed in the initial charge can be either mineral lubricating oil, e.g., dewaxed paraffinic and naphthenic petroleum lubricating or synthetic lubricating oil of the type described in connection with the sulfo reactant. However, if a completely haze free composition is to be assured when the concentrate final product of the invention is employed as an additive in mineral oil lubricant compositions, the lubricating oil ingredient should be a naphthenic lubricating oil of the type obtained in petroleum refining. Advantageously, the lubricating oil component has an SUS viscosity between about 70 and 900 at 100° F., preferably between about 100 and 300. The total lubricating oil content of the initial charge including the lubricating oil associated with the sulfo reactant is advantageously between about 15 and 60 wt. percent. The function of the lubricating oil component is not only to facilitate contact of reactants and to act as a medium for the colloidal suspension of overbased calcium sulfonate but also to facilitate the introduction of the sulfonate in compositions as an additive.

In order to aid the dispersion of the hyperbasic calcium sulfonate particles in the lub oil concentrate, standard dispersants may be employed such as N-octadecylsulfo succinamate, tetrasodium N-(1-2-dicarboxyethyl)-N-octadecylsulfo succinamate, sodium dioxylsulfo succinate, oleyl primary amine, N-"tallow"-1,3-propane diamine and oxylated nonyl phenols of the formula:

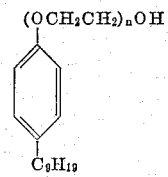

where $n$ is an average integer of from 2 to 9. These dispersants are normally present in the initial reaction mixture in an amount of between 0.1 and 5 wt. percent.

In the final stripping step a stripping gas may be employed such as carbon dioxide or an inert gas, e.g., nitrogen. The purpose of the stripping step is to remove volatile mediums such as the oxygenated vehicle, volatile inert liquid hydrocarbon diluent and any incidental water, that is, water initially introduced or formed as a by-product of the reaction. The stripping is normally accomplished at atmospheric pressure, however, subatmospheric pressure may be employed.

There are several critical aspects in the foregoing procedure and to fully understand these critical aspects the following theory for the foregoing procedure is discussed: Assuming that the sulfo reactant is neutral calcium sulfonate and the basic compound is calcium hydroxide, it is believed that in the hydrogen sulfide treating step the oxygenated vehicle degenerates the neutral sulfonate micelles to monomers, dimers, trimers and etc., while the hydrogen sulfide is simultaneously reacting with the calcium hydroxide to form intermediate calcium hydrosulfide and water, the water in turn functioning to further swell and degenerate the sulfonate micelles. It is further theorized that it is in this step that the final particle size of the hyperbasic calcium sulfonate is determined. The hydrogen sulfide pressure and stoichiometric excess as defined seems to produce soluble intermediate calcium hydrogen sulfide whereas an absence of a stoichiometric excess of hydrogen sulfide and lack of hydrogen sulfide pressure appears to permit the intermediate reaction to allow the continued presence of calcium hydroxide, the existence of which appears to permit the formation of intermediate particles of relatively large size composed of calcium hydroxide coated with an outer layer of calcium hydrogen sulfide. The production of fine colloidal hyperbasic calcium sulfonate particles appear to be directly related to the degree of conversion to the calcium hydroxide to soluble calcium hydrosulfide.

In the carbon dioxide pressure treatment step the intermediate calcium hydrosulfide is believed converted into calcium carbonate with the neutral calcium sulfonate micelle forming a coating around the resultant calcium carbonate particles with the resultant products stabilized by association of the calcium ions from the sulfonate with the carbonate ions of the calcium carbonate. This outer coating prevents the agglomeration of the calcium carbonate particles into the larger unfilterable turbidity creating calcium carbonate particles. Therefore, in essence the term "hyperbasic calcium sulfonate" as used herein is theorized to denote calcium carbonate particles coated with calcium sulfonate.

Now, in respect to the criticalities, if there is insufficient hydrogen sulfide pressure and hydrogen sulfide quantities, calcium hydroxide apparently continues to persist in significant quantities in the reaction, and therefore, when the carbon dioxide treatment follows, calcium carbonate will be directly formed from the inorganic basic calcium reactant and this type of reaction results in the formation of calcium carbonate particles substantially larger than if the carbonate is formed from reaction mixture soluble hydrogen sulfide.

Another material feature is if there is insufficient carbon dioxide and carbon dioxide pressure in the reaction, calcium hydrosulfide will undesirably exist in the final product, calcium hydrosulfide being undesirable since it decomposes in engine operation to corrosive hydrogen sulfide and calcium hydroxide.

Further, from the point of view of producing a hyperbasic calcium sulfonate lube oil concentrate having optimum features in respect to clarity, filterability, stability and solubility, the employment in the method of the invention of sodium petroleum sulfonate of molecular weight of about 500 and a naphthene petroleum base lubricating oil of an SUS viscosity at 100° F. of between about 100 and 300 are most preferred.

Hereinafter and hereinbefore, by the term "oil soluble" we mean soluble in a conventional lubricating oil fraction to the extent of at least about 5 wt. percent. Further, by the term "water-immiscible" we mean a solubility in water of less than 5 wt. percent at room temperature.

The following examples further illustrate the invention but are not to be construed as limitations thereof.

Example I

This example illustrates the method of the invention. The procedure employed broadly was as follows:

The liquid and solid reactants and inert liquid medium were charged to a 2-liter stainless steel reactor. The reacter was sealed and the materials charged thereto were stirred and heated to the desired temperature. The stirring was continued throughout the entire run. Hydrogen sulfide was then continuously introduced through a sparger into the stirred charge mixture and the desired hydrogen sulfide pressure in the reactor was maintained via regulation of the off gas flow. At the end of the hydrogen sulfide reaction period carbon dioxide was then continuously introduced into the reactor through the gas sparger. As in the hydrogen sulfide treating step, the desired carbon dioxide pressure was also regulated via the off gas flow. At the end of the carbon dioxide reaction period, the pressure of the reactor was reduced to atmospheric and the reaction mixture was then stripped to 300° F. under 1 mm. Hg pressure utilizing carbon dioxide as the stripping gas. The stripped product was then filtered through a steam heated 0.1 ft.$^2$ filter at 300° F. under 15 p.s.i.g. pressure, fitted with 0.030" blotter paper which was precoated with a slurry of diatomaceous amorphorous silica filter aid and mineral oil (100 SUS at 100° F.). The recovered filtrate products were species of hyperbasic calcium sulfonate-lubricating oil concentrate of the invention.

The specific test data and results are reported in subsequent tables. In respect to the specific materials employed the following is to be noted.

(1) In Runs A, B, C, D and E sulfo reactant was a calcium petroleum sulfonate of a composition comprising mineral lubricating oil and the calcium salt of petroleum derived sulfonic acid of an average molecular weight of about 430 having the following specific analysis:

| Properties | Run | | |
|---|---|---|---|
| | A | B, C, E | D |
| Wt. percent Ca | 1.6 | 1.75 | 1.85 |
| Wt. percent S | 2.3 | 2.7 | 2.7 |
| Kin. Visc., cs. at 210° F | 122 | 119 | 450 |
| Wt. percent Oil | 62 | 59 | 56 |
| Wt. percent $H_2O$ | <0.5 | <0.5 | <0.5 |

(2) In Runs F and G the sulfo reactant is sodium sulfonate of a composition comprising about 60% sodium petroleum sulfonate of a molecular weight of about 455, about 36 wt. percent mineral lubricating oil diluent, and about 4 wt. percent water having a sodium content of 3 wt. percent. The oil solution had a Kin. Visc. (cs.) at 210° F. of 321.

(3) In Run H the sulfo reactant was an oil solution of about 89 wt. percent dialkyl benzene monosulfonic acid of an average molecular weight of about 453 and 11 wt. percent mineral lubricating oil. The oil solution had a viscosity of 900 SUS at 210° F.

(4) The "Mineral Oil" in Runs A, B, C, D, E, F and G was dewaxed paraffinic base petroleum lubricating oil of a viscosity of about 100 SUS at 100° F. The "Mineral Oil" in Run H was a naphthenic base petroleum lubricating oil of an SUS viscosity of about 300 to 100° F.

(5) The "Dispersant" employed was of the formula:

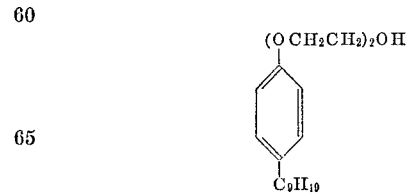

(6) The filtration rate represents the rate in gallons/hour of the first 300 mls. of crude hyperbasic calcium sulfonate concentrate passing per square foot of filter and the filtrate loss represents the wt. percent of hyperbasic calcium sulfonate of the total hyperbasic calcium sulfonate retained on the filter.

(7) The Lumetron number is a relative measure of turbidity with increasing Lumetron values representing increasing turbidity. In measuring turbidity the product filtrate was diluted with mineral lubricating oil of an SUS viscosity at 100° F. of about 845 until the filtrate product represents 25 vol. percent of the resultant solution.

The particular test data and results are reported in Tables Ia and Ib immediately below:

TABLE Ia

| Charge, G. | A | B | C | D |
|---|---|---|---|---|
| Ca Sulfonate | 500 | 457 | 457 | 389 |
| CaO | 123 | 123 | 123 | 123 |
| Methanol | 193 | 190 | 190 | 190 |
| Mineral Oil | 71 | 172 | 172 | 172 |
| Dispersant | 0 | 11 | 11 | 11 |
| Toluene | 413 | 411 | 411 | 415 |
| Water | 39.5 | 39.5 | 39.5 | 39.5 |
| $H_2S$ | 281 | 144 | 136 | 138 |
| $CO_2$ | 600 | 102 | 183 | 730 |
| $H_2S$ Reaction Period: | | | | |
| Time, Hrs | 0.9 | 1.1 | 1.2 | 2.0 |
| Temp., ° F | 61–105 | 74–137 | 61–197 | 75–135 |
| Pressure, p.s.i.g | 35 | 37 | 37 | 50 |
| $CO_2$ Reaction Period: | | | | |
| Time, Hrs | 2 | 5.1 | 1 | 4 |
| Temp., ° F | 88–105 | 137–138 | 78–84 | 80–110 |
| Pressure, p.s.i.g | 35–40 | 6–1072 | 46–46 | 50–50 |
| Filtration: | | | | |
| Rate, g.p.h./ft.² | 3.8 | 15.8 | 4.8 | |
| Loss, Wt. percent | 23.8 | 17.6 | 14.6 | 11.8 |
| Product Filtrate: | | | | |
| Wt. percent Ca | 11.6 | 11.9 | 11.8 | |
| TBN | 286 | 315 | 304 | 287 |
| Kin. Visc., cs. 210° F | 25 | 22.6 | 19.6 | 15.9 |
| Lumetron | 5.6 | | 4 | 4.5 |

TABLE Ib

| Charge, G. | E | F | G | H |
|---|---|---|---|---|
| Ca Sulfonate | 500 | 0 | 0 | 0 |
| Sulfonic Acid | 0 | 0 | 0 | 203 |
| Na Sulfonate | 0 | 307 | 276 | 0 |
| CaO | 123 | 123 | 123 | 134 |
| $CaCl_2$ | 0 | 233 | 21 | 0 |
| Methanol | 192 | 190 | 190 | 190 |
| Mineral Oil | 49 | 242 | 273 | 346 |
| Dispersant | 22 | 22 | 22 | 22 |
| Toluene | 413 | 415 | 415 | 415 |
| Water | 39.5 | 39.5 | 39.5 | 43 |
| $H_2S$ | 236 | 169 | 163 | 147 |
| $CO_2$ | 202 | 365 | 365 | 397 |
| $H_2S$ Reaction Period: | | | | |
| Hours | 2.25 | 2.8 | 3.2 | 25 |
| Temp., ° F | 60–100 | 100–120 | 95–118 | 90–126 |
| Pressure, p.s.i.g | 48 | 50 | 50 | 50 |
| $CO_2$ Reaction Period: | | | | |
| Hours | 3 | 2 | 2 | 2 |
| Temp., ° F | 69–99 | 98–108 | 99–116 | 100–118 |
| Pressure, p.s.i.g | 48 | 50 | 50 | 50 |
| Filtration: | | | | |
| Rate, g.p.h./ft.² | 6.7 | 13.6 | 13 | 11.5 |
| Loss, Wt. percent | 19.8 | 9.5 | 10.6 | 19.81 |
| Product Filtrate: | | | | |
| Wt. percent Ca | 11.7 | | 11.9 | 11.5 |
| TBN | 296 | 313 | 292 | 295 |
| Kin. Visc., cs., 210° F | | 28.7 | 22.8 | 41 |
| Lumetron | 4 | 9 | 5.5 | |

Example II

This example illustrates the criticality of a hydrogen sulfide and carbon dioxide pressure reaction in respect to filterability and turbidity of the hyperbasic calcium sulfonate lube oil concentrate final product. Runs AA and BB described below in Table II utilized identical materials, quantities and process conditions with the exception that in Run AA the hydrogen sulfide and carbon dioxide contact is operated at atmospheric pressure and in Run BB, a representative run of the method of the invention, the contact is conducted at 50 p.s.i.g.

The broad procedure and "Dispersant" was that employed in Example I. The "Mineral Oil" employed was a petroleum naphthenic base lubricating oil of an SUS viscosity of 100 at 100° F. The sodium sulfonate reactant employed was a mineral oil solution of sodium petroleum sulfonate of a molecular weight of 500 giving the following analysis: sodium wt. percent=31; water wt. percent=3.6; specific gravity 60/60=1.01; Visc. cs. 210° F.=257; mineral oil content wt. percent=38.

The test data and results are reported below in Table II:

TABLE II

| Charge, lbs. | Run AA | Run BB |
|---|---|---|
| Na Sulfonate | 11.5 | 11.5 |
| CaO | 4.65 | 4.65 |
| $CaCl_2$ | 0.84 | 0.84 |
| Methanol | 5.7 | 5.7 |
| Mineral Oil | 10.2 | 10.2 |
| Dispersant | 0.79 | 0.79 |
| Toluene | 6.8 | 6.8 |
| Water | 0.50 | 0.50 |
| $H_2S$ | 16.0 | 16.0 |
| $CO_2$ | 14.0 | 14.0 |
| $H_2S$ Reaction Period: | | |
| Hours | 4.2 | 4.2 |
| Temp., ° F | 102–118 | 100–133 |
| Pressure, p.s.i.g | 0 | 50 |
| $CO_2$ Reaction Period: | | |
| Hours | 3.1 | 4.0 |
| Temp., ° F | 102–118 | 85–120 |
| Pressure, p.s.i.g | 0 | 50 |
| Filtration: | | |
| Rate, g.p.h./ft.² | (¹) | 1.5 |
| Loss, Wt. percent | (¹) | 5.4 |
| Product Filtrate: | | |
| TBN | (¹) | 294 |
| Kin. Visc. cs., 210° F | (¹) | 27.52 |
| Lumetron | (¹) | 5.0 |

¹ Filter blinded.

We claim:
1. A method of producing hyperbasic calcium sulfonate-lubricating oil concentrate comprising:
  (a) forming a first reaction mixture comprising a sulfo reactant selected from the group consisting of oil soluble sulfonic acid and normal alkali metal and calcium salt thereof, a basic compound selected from the group consisting of calcium hydroxide, a combination of calcium oxide and water in a mole ratio of between about 1:0.1 and 1:5, and mixtures thereof, an oxygenated vehicle selected from the group consisting of lower alkanols and lower alkoxyethanols, a lubricating oil selected from the group consisting of synthetic lubricating oil and mineral lubricating oils of an SUS viscosity at 100° F. of between about 70 and 900, said sulfo compound, said basic compound and said oxygenated vehicle being present in a mole ratio of between about 1:2:5 and 1:18:70, said lubricating oil being present in an amount between about 15 and 60 wt. percent based on said first reaction mixture;
  (b) injecting hydrogen sulfide into said first reaction mixture at a temperature between about 60 and 200° F. under a hydrogen sulfide pressure of at least about 10 p.s.i.g. and in a mole ratio of hydrogen sulfide to said basic compound of at least about 1:1 to form a hydrogen sulfide treated second reaction mixture;
  (c) injecting carbon dioxide into said hydrogen sulfide treated second reaction mixture at a temperature between about 60 and 200° F. under a carbon dioxide pressure of at least about 10 p.s.i.g. in a mole ratio of carbon dioxide to basic compound of at least about 1:1 to form a carobn dioxide treated third reaction mixture;
  (d) subsequently stripping off said vehicle and incidental water from said carbon dioxide treated third reaction mixture.

2. A method in accordance with claim 1 wherein said sulfo reactant is normal calcium sulfonate, said basic compound is said combination of calcium oxide and water, said oxygenated vehicle is methanol, wherein said first reaction mixture also includes between about 10 and 40 wt. percent of a volatile inert liquid hydrocarbon having a boiling point between about 170 and 300° F. and between about 0.1 and 5 wt. percent dispersant and wherein said volatile liquid hydrocarbon is removed via said stripping.

3. A method in accordance with claim 1 wherein said sulfo compound is alkali metal sulfonate, said basic compound is said combination of calcium oxide and water, said oxygenated vehicle is methanol and wherein said first reaction mixture also includes calcium halide in a mole ratio of said sulfo compound to said halide of between about 2:1 and 2:1.1 and also includes between about 10 and 40 wt. percent volatile inert liquid hydrocarbon of a boiling point between about 170 and 300° F. and between about 0.1 and 5 wt. percent dispersant and wherein said hydrocarbon is removed via said stripping.

4. A method in accordance with claim 1 wherein said sulfo compound is oil soluble sulfonic acid, said basic compound is said mixture of calcium oxide and water, said oxygenated vehicle is methanol and wherein said first reaction mixture also includes a volatile inert liquid hydrocarbon having a boiling point between 170 and 300° F. in an amount of between about 10 and 40 wt. percent and between about 0.1 and 5 wt. percent of a dispersant, and wherein said hydrocarbon is removed via said stripping.

5. A method in accordance with claim 2 wherein said sulfo compound is calcium petroleum sulfonate derived from an oil soluble petroleum sulfonic acid of a molecular weight between about 450 and 550, said hydrocarbon is toluene, said oxygenated vehicle is methanol, said dispersant is of the formula:

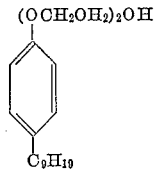

and said lubricating oil is mineral lubricating oil of an SUS viscosity between about 100 and 300 at 100° F.

6. A method in accordance with claim 3 wherein said sulfo compound is sodium petroleum sulfonate derived from an oil soluble petroleum sulfonic acid of a molecular weight between about 450 and 550, said hydrocarbon is toluene, said calcium halide is calcium chloride, said dispersant is of the formula:

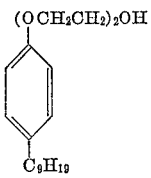

said lubricating oil is mineral lubricating oil.

7. A method in accordance with claim 6 wherein said sodium petroleum sulfonate has a molecular weight of about 500 and said mineral lubricating oil is a petroleum naphthene lubricating oil.

8. A method in accordance with claim 4 wherein said sulfo reactant is dialkylbenzene sulfonic acid of a molecular weight between about 450 and 550, said hydrocarbon is toluene, said dispersant is

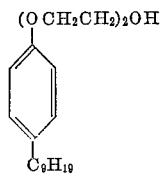

said lubricating oil is mineral lubricating oil.

9. A method in accordance with claim 1 wherein said stripped third reaction mixture is filtered.

References Cited

UNITED STATES PATENTS

| | | | |
|---|---|---|---|
| 2,961,403 | 11/1960 | Blumer | 252—33 |
| 3,057,896 | 10/1962 | Schlicht et al. | 252—33 X |
| 3,172,855 | 3/1965 | Rogers et al. | 252—33 X |
| 3,250,710 | 5/1966 | Hunt | 252—33 |
| 3,256,186 | 6/1966 | Greenwald | 252—33 |
| 3,312,618 | 4/1967 | Le Suer et al. | 252—42.7 X |

FOREIGN PATENTS

| | | |
|---|---|---|
| 212,328 | 1/1958 | Australia. |
| 525,894 | 6/1956 | Canada. |
| 600,450 | 6/1960 | Canada. |

DANIEL E. WYMAN, *Primary Examiner.*

P. P. GARVIN, *Assistant Examiner.*